(12) United States Patent
Pilgrim et al.

(10) Patent No.: US 11,582,403 B2
(45) Date of Patent: Feb. 14, 2023

(54) SYSTEM AND METHOD FOR IMAGE STITCHING

(71) Applicant: Bevilacqua Research Corporation, Inc, Huntsville, AL (US)

(72) Inventors: Robert Pilgrim, Benton, KY (US); Roy Brown, Huntsville, AL (US); Chuck Bryant, Huntsville, AL (US); Lee Gay, Huntsville, AL (US); Glenn Hembree, Mobile, AL (US)

(73) Assignee: Bevilacqua Research Corp., Huntsville, AL (US)

( * ) Notice: Subject to any disclaimer, the term of this patent is extended or adjusted under 35 U.S.C. 154(b) by 0 days.

(21) Appl. No.: 17/540,247

(22) Filed: Dec. 2, 2021

(65) Prior Publication Data
US 2022/0150418 A1 May 12, 2022

Related U.S. Application Data

(60) Provisional application No. 63/173,222, filed on Apr. 9, 2021, provisional application No. 63/120,324, filed on Dec. 2, 2020.

(51) Int. Cl.
*H04N 5/265* (2006.01)
*H04N 5/232* (2006.01)
*H04N 5/247* (2006.01)

(52) U.S. Cl.
CPC ......... *H04N 5/265* (2013.01); *H04N 5/23229* (2013.01); *H04N 5/247* (2013.01)

(58) Field of Classification Search
CPC .... H04N 5/265; H04N 5/247; H04N 5/23229; H04N 5/23241
USPC ........................... 348/143, 159, 211.11, 239
See application file for complete search history.

(56) References Cited

U.S. PATENT DOCUMENTS

2021/0400193 A1* 12/2021 Ma ..................... H04N 5/23229

* cited by examiner

*Primary Examiner* — Sherrie Hsia
(74) *Attorney, Agent, or Firm* — Chris Tanner; FYPA LLC

(57) ABSTRACT

A system for stitching images together is disclosed. The images are sometimes referred to as frames, such as frames in a video sequence. The system comprises one or more imagers (e.g. cameras) that work in coordination with a matching amount of custom code modules. The system achieves image stitching using approximately one third the Field of View (FOV) of each imager (camera) and also by increasing the number of imagers to be above a predetermined threshold. The system displays these stitched images or frames on a computer monitor, either in a still-image context but also in a video-context. Normally these tasks would involve a great detail of computation, but the system achieves these effects while managing the computational load. In stitching the images together, it is sometimes necessary to introduce some image distortion (faceting) in the combined image. The system ensures no gaps in any captured view, and assists in achieving full situational awareness for a viewer.

6 Claims, 20 Drawing Sheets

STEP 1 search a first frame, strive to find a small patch (chunk) of the frame that has an optimal amount of detail, edges, color changes, other;

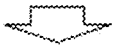

STEP 2 once selected, set up a four boundary blocks for marking out (mapping) of the chosen small patch (chunk);

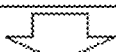

STEP 3 bring a second frame that is similar to the first frame into the system 100;

STEP 4 search the second frame for any small patch (chunk) that has the main characteristics of the selected (marked by four boundary blocks) region within the first frame;

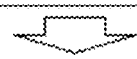

STEP 5 select as best can be determined a matching region within the second frame;

STEP 6 perform various types of processing on both images; and

STEP 7 display the altered images to the user, where the altered video sequence makes more sense to the human eye.

FIG. 2

Joint Battle Command-Platform 1100

SYSTEM AND METHOD FOR IMAGE STITCHING

BACKGROUND OF THE INVENTION

Capturing images of a particular space or location from multiple points of view will result in each image showing their separate perspective. However, viewing these separated images at the same time can result in a type of disjointed effect, or an impression of them being non-linear. Consequently, a mechanism for achieving image-stitching is desired.

BRIEF DESCRIPTION OF THE DRAWINGS

FIG. 2 shows a flowchart of some steps performed by the system;

DETAILED DESCRIPTION OF PREFERRED EMBODIMENTS

Overview

To best understand the embodiments herein, it is necessary to first perceive and contemplate what the human eyes typically do in processing an image. No two eyes, nor two cameras, are ever going to see the exact same view. There will always be a slight offset such that the images are not twins, but instead slightly mismatched, and also having differing perspective. This is sometimes referred to as a "bow tie" effect.

A person can hold up a finger, dead center, close one eye and the finger moves to the right. Close the other eye and the finger drifts to the left. Human eyes are close in distance, but still separated a bit. So a viewer gets two different scenes and their brain stitches the two different views. A typical human brain does all this for a person, it does the stitching in a stitching area, and also accounts for faceting or artifacting. Hence the phrase "image stitching".

Most people's brain and eyesight and sensory equipment correct for this effect, such that most people go their entire lives without being aware of it or being concerned about it. Most people have an innate ability to "stitch" images together. However, computers do not have this ability and so it must be artificially generated. This ends the overview section.

Figure 1A:
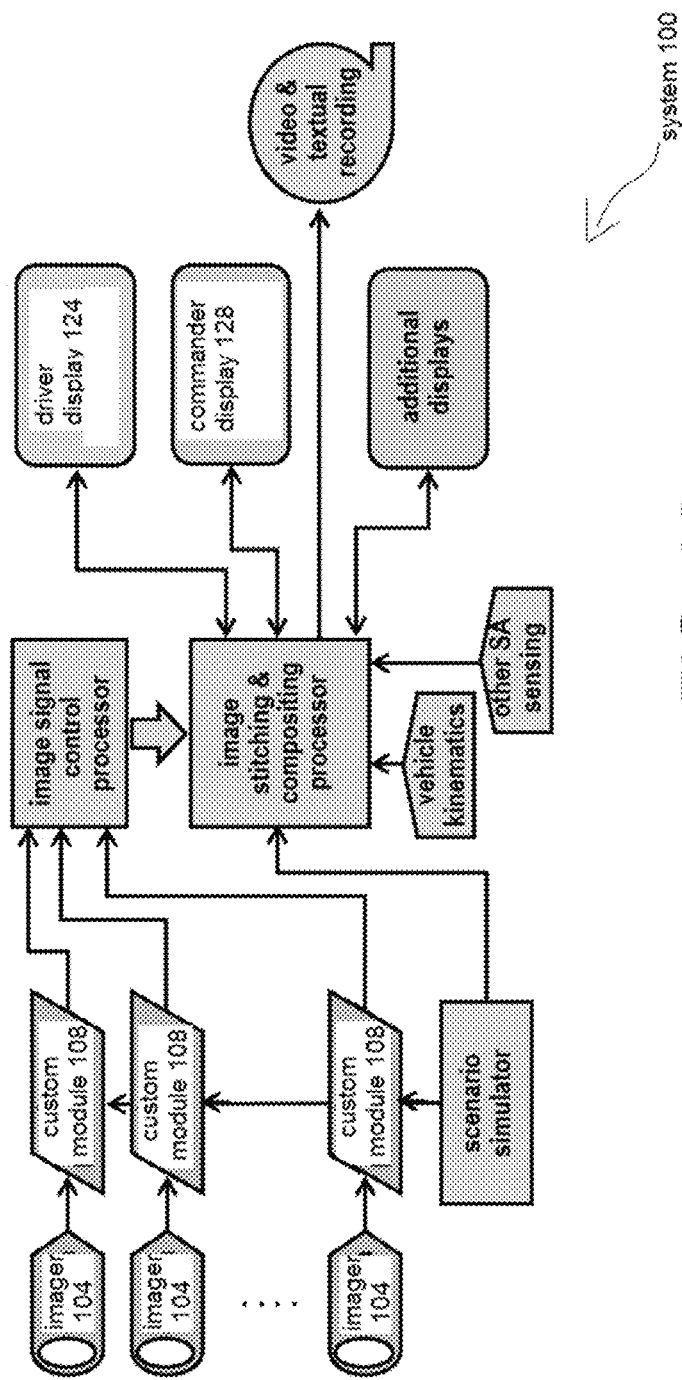
FIGS. 1A, 1B, and 1C show a system for stitching images together.
Figure 1B:
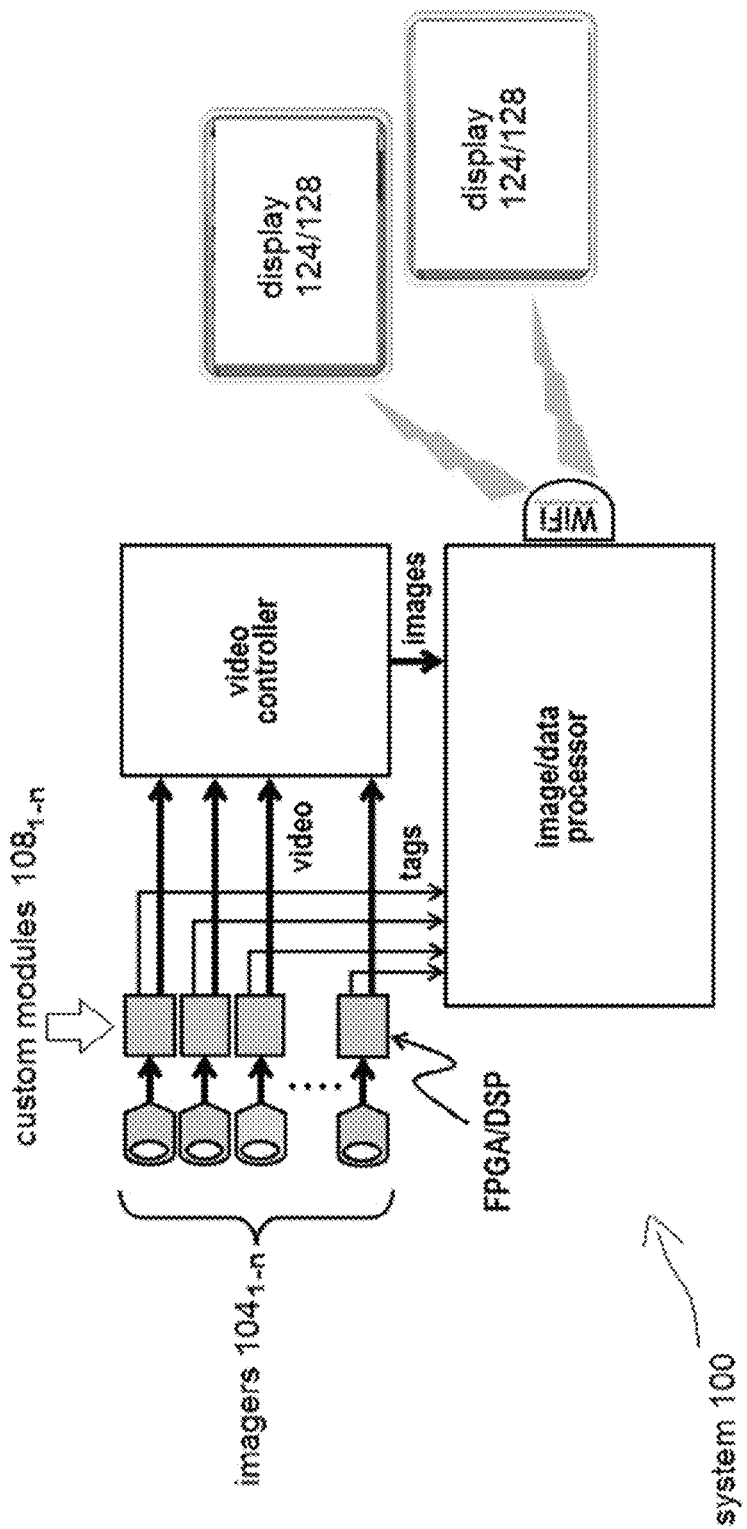
Figure 1C:
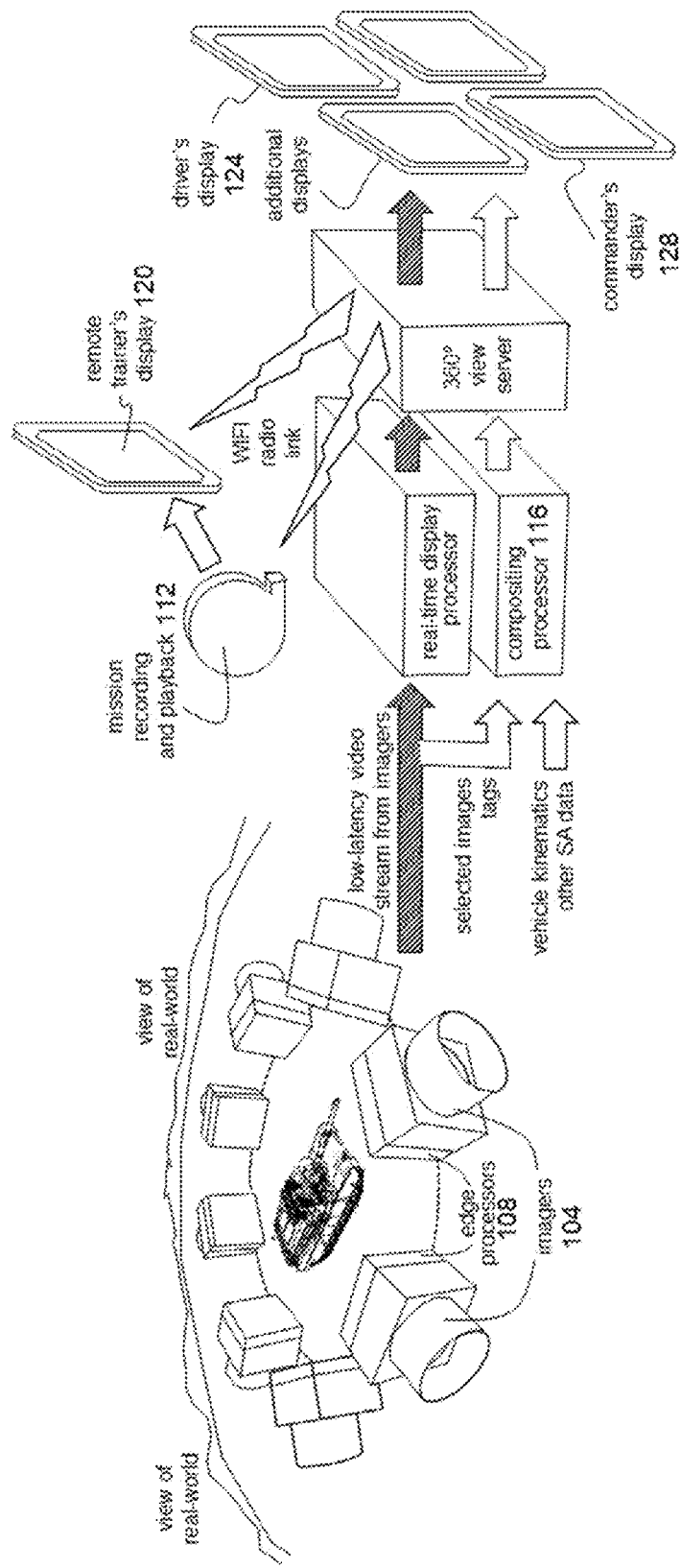

FIGS. 1A, 1B, and 1C show a system 100 for stitching images together. The system 100 comprises one or more imagers (e.g. cameras) 104, that work in coordination with custom code modules $108_{1-n}$. FIG. 1C shows another way of viewing the system 100. Within the embodiments herein, the example of military tanks will often be used in the various Figures, but sometimes cars will be assumed, such as within the sections discussing autonomous driving. FIG. 1C shows the imagers 104 and the custom modules (edge processors) 108, along with a mechanism for mission recording and playback 112, a compositing processor 116 (see also FIG. 9), a remote trainer's display 120, a driver's display 124, and a commander's display 128.

The system 100 achieves image stitching using approximately one third the Field of View (FOV) of each imager 104 and strives to maximize the number of imagers 104. The system 100 greatly reduces computational load, but introduces some image distortion (faceting). The system 100 thus ensures no gaps in a captured view, and achieves full situational awareness.

The custom modules 108 can be combinations of FPGAs (Field Programmable Grid Array), DSPs (Digital Signal Processor), and/or edge processors. FPGAs are the most adaptable of the three, have the lowest latency, permit customizable kernels, and can have dual output e.g. video and tags. DSPs have a simpler software design than FPGAs. Edge processors have low latency and also have a simpler software design than FPGAs.

It is intended that the imagers 104 be expendable/replaceable. Because of the two third overlap between the various Field of Views (FOVs), the system 100 gracefully degrades the images being stitched. As shown at least within FIGS. 13A and 13B, the system 100 can achieve full 360 degree coverage given a sufficient amount of imagers $104_{1-n}$. At least, the system 100 achieves this until e.g. two or more adjacent imagers $104_{1-n}$ are damaged.

The system 100 achieves embedding symbology to identify keep-out regions and roll-over hazards and apply these to a real-time video feed. When performing stitching between two different images taken by two different images 104, there will be points unique to each image. If the two images are exactly the same, something is clearly wrong.

The system 100 utilizes a matching algorithm that gives preference to a subset of closely matched points over (near zero-distance pairs) over lower total distance. Since a density of generated registration points is not known, the various algorithms within the system 100 must be adaptive.

The system 100 strives to make images look more accurate, and performs certain types of image-processing (FIG. 2) to provide visual assistance to a user. Merely taking two raw images and just jamming them together will look strange. Portions will not line up correctly because of the different view coming from the cameras. Un-modified, these images might seem out of focus or some other flaw, perhaps an unexpected size change.

FIG. 2 shows a flowchart of some steps performed by the system 100. Within the embodiments herein, it will always be assumed that multiple images need to be stitched together. This can occur at least 3 different embodiments. a) a single camera, taking live video; b) multiple cameras positioned near each other, each taking single-standalone images at the same time; or c) multiple cameras positioned near each other, each taking video at the same time, where embodiment c) is merely embodiment b) scaled over time.

Regarding embodiment c), another important factor is that the set of multiple video cameras will likely be moving. Within this disclosure, embodiment b) is used a lot, but mainly for the purpose of explanation and clarity. Patent disclosures cannot include video, so they must explain things in a static context, where embodiment b) is more explainable.

As shown in FIG. 2, the following steps occur as part of image stitching. STEP 1 search a first frame, striving to find a small patch (chunk) of the frame that has an optimal amount of detail, edges, color changes, in just that small patch (chunk). By small, that means perhaps 1/100 the size of the overall frame. The system 100 must find the best small patches (chunks) that contain detail that is highly unlikely to make an accidental match with a following or adjoining frame. The image stitching (frame stitching) computational processes described herein take steps in choosing the small patches (chunks) that a big selection criteria is that these small patches chunks) are likely to appear in a following image (if single-camera video), or likely to appear in an adjoining frame (if multi-camera video).

STEP 2 within the chosen (first) frame, once selected, set up a four boundary blocks for marking out (mapping) of that chosen small patch (chunk);

STEP 3 bring a second frame that is similar to the first frame into the system 100;

STEP 4 search the second frame for any small patch (chunk) that has the characteristics of the selected (marked by four boundary blocks) region within the first frame;

STEP 5 find the matching (marked by four boundary blocks) region within the second frame;

STEP 6 once the matching (marked by four boundary blocks) region within the second frame is found, perform various types of processing on both images;

STEP 7 display the altered images to the user; but where that new/altered video sequence makes more sense to the human eye and have more/better useful information for human eyes to process and make decisions with the information (e.g. obstacle avoidance while driving).

The system 100 assesses differences between two pixel diffed images to determine similarity and this results in a reduction of processing. Doing so reduces processing power, hassle reduces processing time so that the system 100 can find useful video information faster because of reduced processing.

Performing computations take time, and the image processing described herein must be performed quickly. Thus, the embodiments herein reduce computations.

Using an example of video taken by a vehicle, while that vehicle is in motion, some things move fast, but other things move slow. It's not possible to do processing on an entire image (frame). So, instead, the system 100 finds a small patch of the image in one frame, and then go to the next frame in the video and try to find that same small patch (chunk) which likely has moved slightly or changed in some way from one frame to the next. The embodiments herein achieve a computationally efficient way for finding that suitable small patch (chunk).

Here is one advantage of letting the system 100 find a small patch within an adjacent or following frame. An unprocessed set of cameras could take a picture of a parking lot with e.g. 20 cars, the cars having trees and shrubbery in a scrub area well behind the parking lot. Using conventional unprocessed camera imaging, a photo of the parking lot could fool the eye into seeming like a car is buried within a tree or some other misleading arrangement. This is mainly due to conventional cameras lacking ability to sort a foreground from a background. Instead, they rely on a human viewer to quickly sort this out. Meanwhile, after processing two similar images using the system 100, those images will line up better, partly because the system 100 can properly sort a foreground from a background.

Setting aside finding the small patch (chunk), there is also an issue of, within a sequence of images, matching the image size. In any sequence of images, e.g. video, viewers want\need the size of the two images needs to be the same. When multiple cameras are used, or where a single camera may be moving, a video can change size without any warning. Upon displaying the images, this visual effect appears abrupt to a viewer, can make the experience uncomfortable.

The human eye has a way of correcting for this, the human brain has a way of correcting for this, just like the human eye/brain has a way of performing auto-stitching. But the human brain ceases applying auto-stitching to video sequences, as video typically appears in 2D digital displays that remain in the exact same position relative to the human eye. Hence, the size matching of the system 100 is another feature important to a suitable visual experience.

Faceting

A faceting effect occurs where images get stitched together, but where some imperfections occur, somewhat like stitch-bumps on human skin. One way to remove such a seam or faceting effect is to use bow tie warping. At the interface that the mismatch of the size of the image, distortion is another way of saying faceting. Artifact is another way of saying distortion. Faceting effects are where a viewer may see the transition from one camera to the next, either through bumps or stretching.

Within just the naked human eye doing vision processing, some faceting occurs but is not harmful. Almost all humans have resources for overcoming faceting. This depends on what level of detail is needed. Of course, it would be better if there were no faceting and everything was just one great big smooth universe, like in a video game engine. But that is not how the human eye works.

Bow Tie Warping

Figure 3:
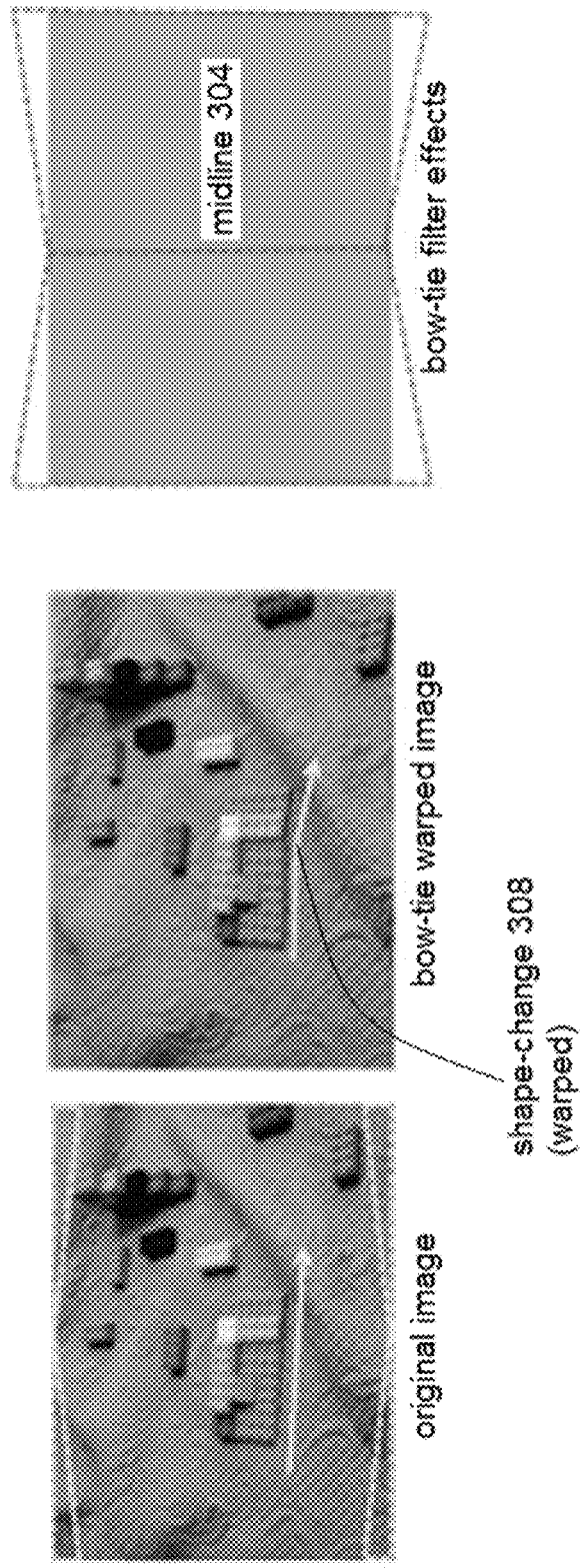
FIG. 3 shows bow-tie warping in order to address the problem of faceting at a midline.

FIG. 3 shows bow-tie warping in order to address the problem of faceting at a midline 304. Specifically, FIG. 3 shows various colored building blocks on a blanket. This arrangement was specifically set up to emulate physical objects positioned on a bland, non-descript background (the blanket), demonstrating a test of image stitching by the system 100. The two images are similar, but differ by a few pixels, thus pixel-diffed. It is important to be aware that the images are not perfectly aligned. The building blocks are to provide a demonstrable visual aid to convey how such non-alignment can be overcome, including the fact that a slight shape-change 308 or warping in one of the building blocks. This bend is slight, unimportant, and barely noticeable. Allowing for such slight warping is advantageous for assisting the overall usefulness of the system 100, of image stitching, and of bow-tie warping in particular.

The action of a bow-tie warping filter is to match the vertical scale of the left and right sides of an image to the vertical scale at the midline 304. The purpose of applying the bow-tie warping filter to images is to reduce the computations required to stitch a strip of images when generating a multi-camera wide field-of-view composite image such as a 360 degree panoramic view. Bow-tie warping can be performed at video rates, possibly within the custom module 108 associated with an imager 104. Once bow tie warping is applied, image stitching requires no additional warping or other forms of image distortion.

The effect of bow tie warping on images is that straight edges crossing a midline will be bent slightly and wedges of the original image at the top and bottom may be clipped. In existing methods such minor effects are removed in order to ensure image stitching, but at great expense on computation. There are many applications in which fast reliable image stitching is required and the faceting effect created by this method are of no concern.

An efficient method of implementation avoids the use of computationally expensive trigonometric functions, by simply adding a number of additional pixels to each vertical line left and right of the midline. The number of pixels being added is in proportion to the distance the line is from the midline 304. For example: in adding 50 pixels at the far left and right edges of the image. The number of pixels added to a vertical line that is halfway between the midline 304 and an edge would be 25. Typically the added pixels are evenly distributed along the line with their color values affected by existing pixels in the neighborhood of the location they are being added.

Figure 4:
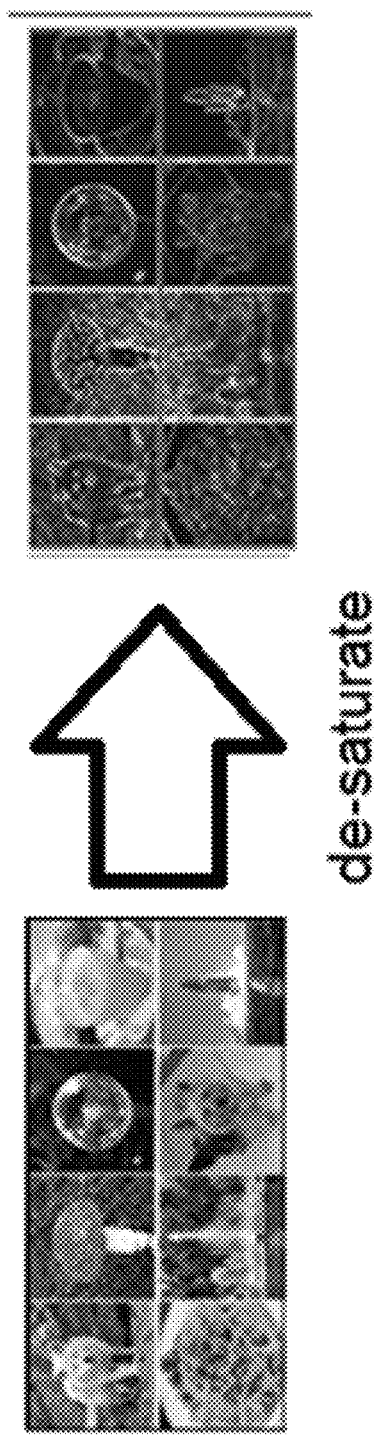
FIG. 4 shows examples of de-saturating images.

Within this disclosure, everyday recognizable conventional images such as dogs, rockets, or pasta are used within this disclosure in order to make the subject matter more recognizable and hopefully easier to understand. To that end, FIG. 4 shows examples of de-saturating such conventional images. The specific dogs or rockets don't matter to the embodiments herein, but are chosen mainly because they are quickly recognizable. The principle of finding edges, phase detection, edge detection is what is important. The system 100 takes the brightness (saturation) out of the color image on the left first, leaving with the black and white image on the right. Transforming a color image into a black and white version makes it easier to do edge-selection by making it easier to look for differences from one pixel to the next. These differences are easier to find when color information is largely removed.

Figure 5A:
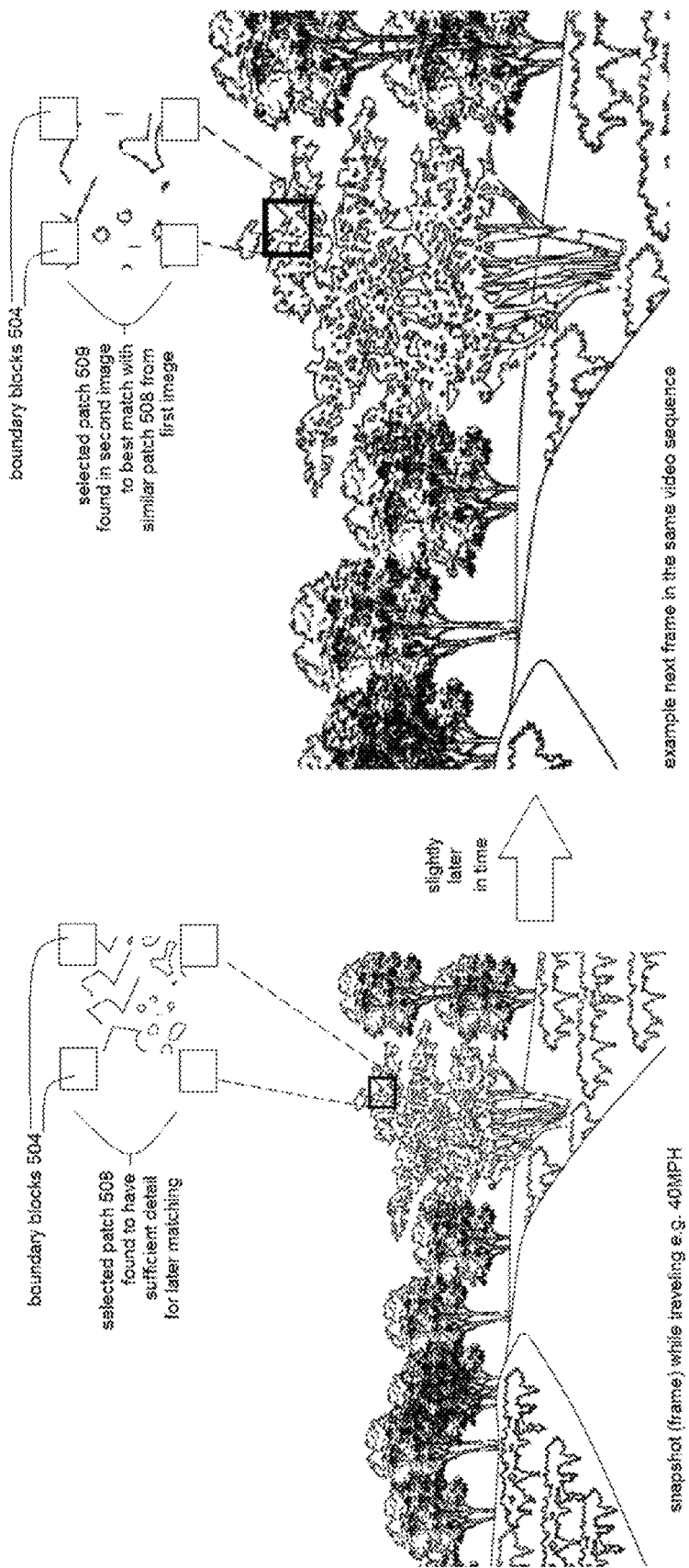
FIGS. 5A, 5B, and 5C all show two sets of similar but slightly different images in which patches are sought.
Figure 5B:
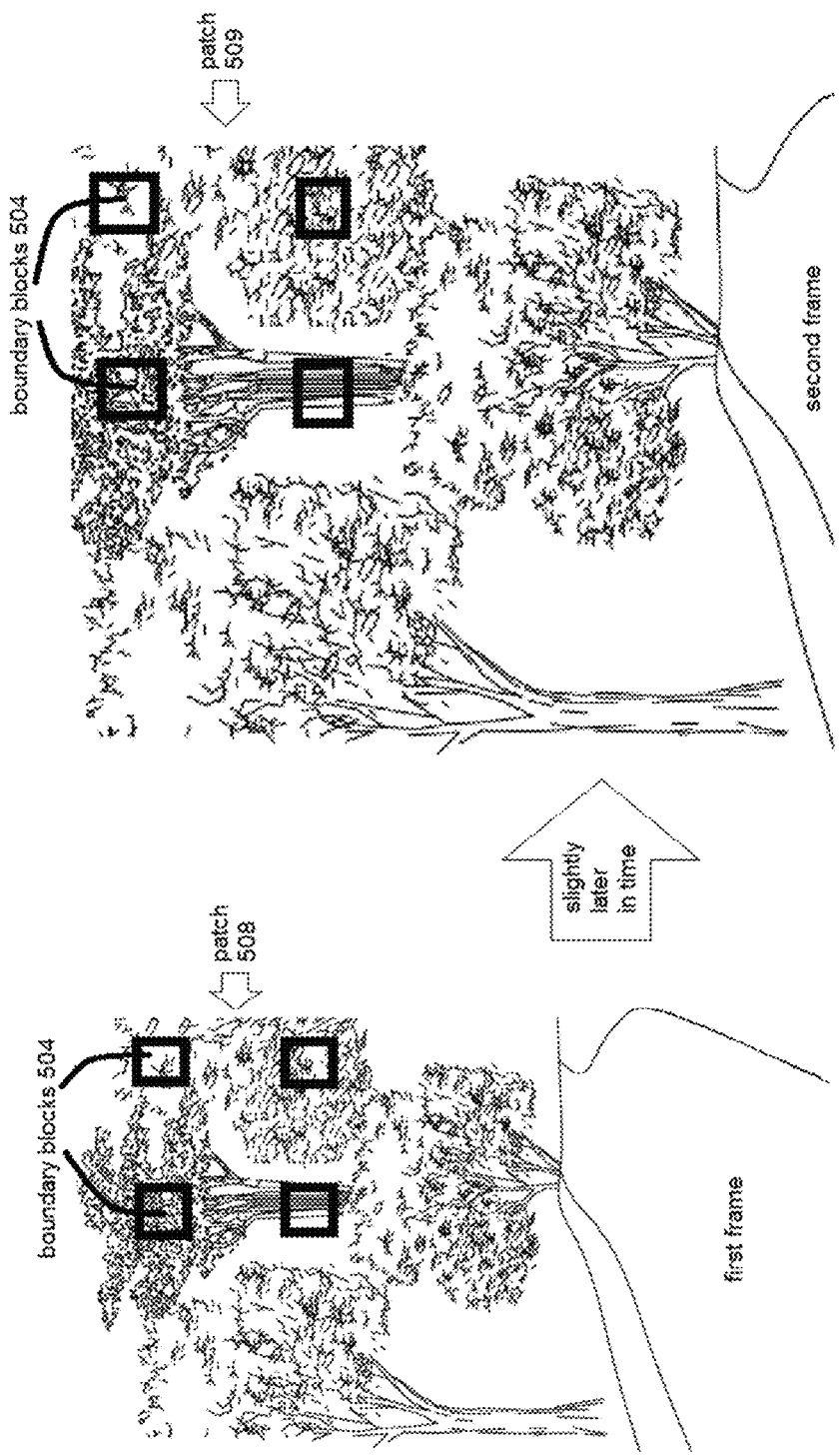
Figure 5C:
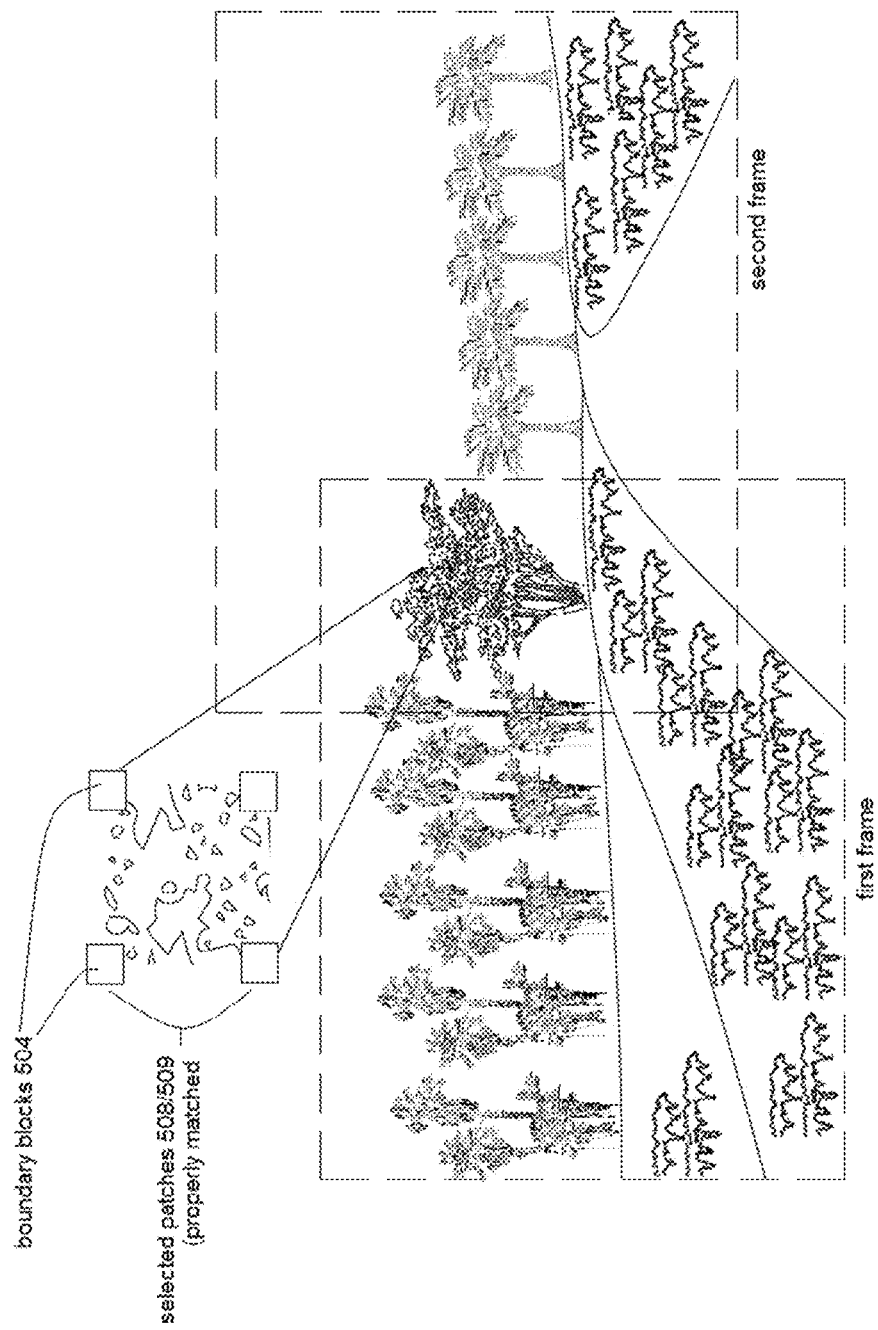

FIGS. 5A-5C all show two sets of similar but slightly different images. The system 100 uses an algorithm to find the matching portion in a different frame. A two-step process achieves a significant reduction in processing in applications where a particular image patch 508 is being tested on a larger region of another image. Thus, there are two things the system 100 must do right away. The first is to find a suitable patch 508 (chunk). Make this selection based on whether that patch has enough information and it could be detectable. That alone is a considerable amount of computation, and that is only for the first step.

Continuing this method of image registration, the system 100 arranges that the patches bounded by yellow boundary blocks 504 were pixel-diffed and then the absolute 2D pixel-to-pixel differences were summed. The patch 508 with the maximum summed value was found in the left (first, or initial) frame. This patch 508 as then compared to a search region of the right (second, or subsequent) frame to find a patch 509 with the minimum absolute summed difference. This was selected as the best match for image registration.

Now assume the two frames are covering the same area. The system 100 has at least two imagers (e.g. cameras) 104, but might have ten imagers 104. Any pair of cameras is going to overlap. Some parts of their images overlap. Otherwise there will not be a full view. The four boundary blocks 504 form the borders of the small patch 508/509. Because this is a patent disclosure, something recognizable like squares are chosen for their easy quick recognizability, and unlikely to occur in nature or in photographs. However, other shapes could also be used to signify boundaries. Also, the four boundary blocks likely outline a rectangular region 504, not always a square region.

Remember that a video is nothing but a continuous stream of still images. A video is nothing but a grouping of still frames. As such, the four boundary blocks 504 isolating a specific patch 508 to be used in a search for a matching patch 509 within another similar image.

Disadvantages Overcome by the Embodiments Herein

There are large chunks of images where there's not sufficient detail. Assume a picture of a piece of typing paper, e.g. an off-white. In processing such an image (frame), almost all pixels will have the same color and no contrast. The embodiments herein have more difficulty finding a matching spot in a corresponding frame. Most images in nature have enough detail to make a good selection.

When image-matching, the first thing to do is to pick a threshold below, to act as a matching patch 508. Strive to find the most complex patch 508. The greater the complexity, the more likely to find an accurate matching patch 509 in a following frame. Thus, when preparing to do image stitching, complexity is sought after, and bland white or off-white should be avoided or reduced in probably to being selected as a small patch 508.

Accordingly, once a search of an image for a small patch is completed and a patch 508 is selected, the system 100 then looks through the subsequent (second, right-side) frame and find that same patch 509 or something very close. And once found, put those patches on top of one another, then those two, the images are lined up in that region are now locked up. The two frames may not entirely jibe, they may not fully line up vertically or horizontally, but the next thing is move the frames such that the blocks line up with each other, thus achieving image stitching. One way to move the images is through bow-tie filtering (see FIG. 3), but that is not the only way.

Keep in mind that those two images are not the same, they're the same environment, the same thing place in the world, but the cameras are in different locations, Just like with human eyes, the two frames will be a little shifted. Images seen by two separate human eyes are never exactly the same. So that, that difference vision doesn't affect the matching.

Issues\Advantages Involving Cameras in Motion

With full motion video, the sequential images are not side by side. They're one behind the other. They're only two frames out of a video. So if a video camera running and it's running at 30 frames, a second, that car is going 40 miles an hour down the road.

Accordingly, 1/30th of a second later, the car view will be this many feet forward. So different parts of the image will be closer to the viewer. Everything in front is getting closer to. But the things that are, that are up here and close are going to be moving faster than the things that are down there far away in terms of angle. Drive along at night with the moon shining, but the moon's not going to fall. As the car moves forward a hundred feet, the visual information on the bottom of the hill will move a few pixels. But there exists other material that is going to move 20 or 30 pixels. Meanwhile, any clouds will not move at all, thus zero pixels difference. The moon will not move, thus zero pixels difference.

The system 100 grabs two sequential frames from a video sequence, start comparing them, and find the small patch 508 to be selected. Then move forward and find the matching patch 509 in the subsequent frame. Using the concrete pavement of FIG. 6 as an example, there's not enough texture in there. If there's no information in that gray road, than no small patch should be chosen. It would be better to take the small patch from the grass, shrubs, or trees.

Figure 6:
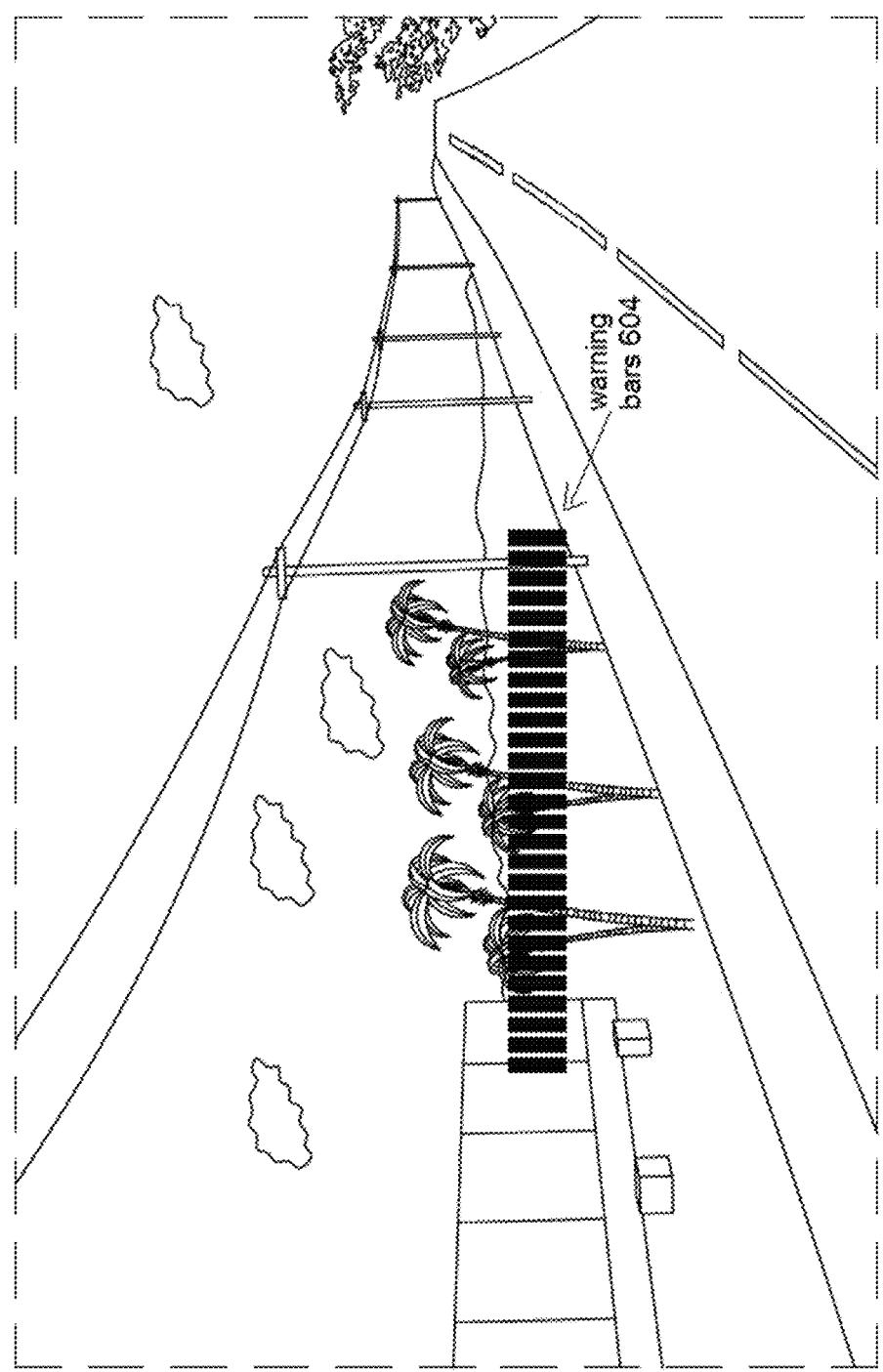
FIG. 6 shows example vertical danger bars.
Figure 9:
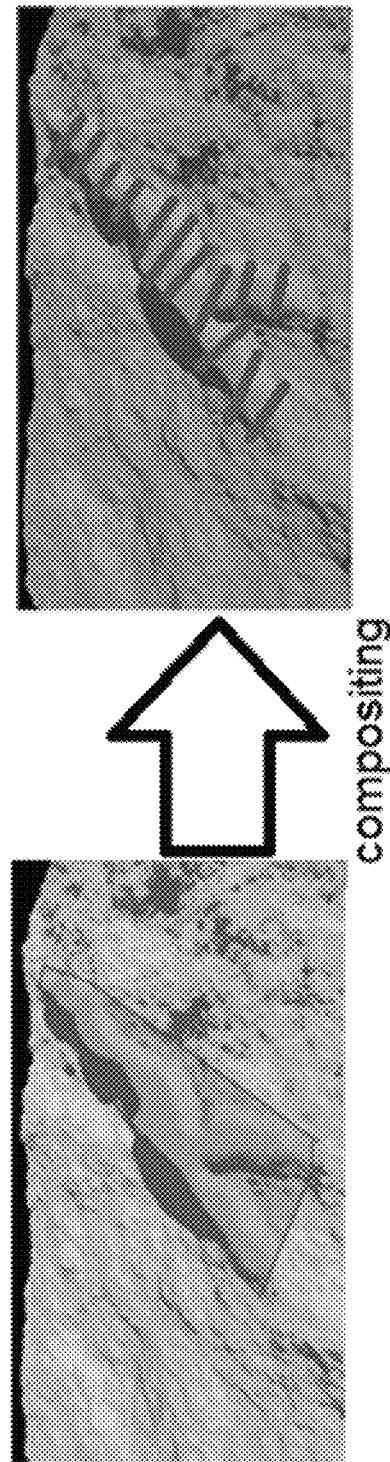
FIG. 9 shows a large bump in a road and then a visual composite for making this bump quickly recognizeable to a driver.

To demonstrate what's going on in FIG. 6, coming up this hill. It's hard to see in the picture, but there's a large grove of big trees coming up on the LH shoulder. So that chunk of the trees is a lot closer to the shoulder, a lot closer than the grass. The vertical danger bars 604 in FIG. 6 are meant to quickly indicate "avoid this area". The telephone poles do not get this same warning. While telephone poles are a severe hazard, can be extremely bad for a car to run into, they are typically always positioned at the same distance from the road, and a driver, even a non-alert driver, will likely already know about the telephone poles and not be surprised by them. However, the grove of trees in FIG. 6 close to the road is more unlikely, and thus more appropriate to trigger a warning such as the vertical bars of FIG. 6. However, within the system 100, other types of alert mechanisms besides simple vertical bars could also be used. FIG. 9 is one example, a type of compositing, where bars are used but in a more shape-adapting pattern. Also, FIG. 9 is at night, where a driver will likely need more assistance and warnings.

Figure 8:
FIGS. 7 and 8 show example distinguishable entities such as roll-over, drop-offs, deep water, and mud, and assigning "hazard percentages" accordingly.
Figure 7:
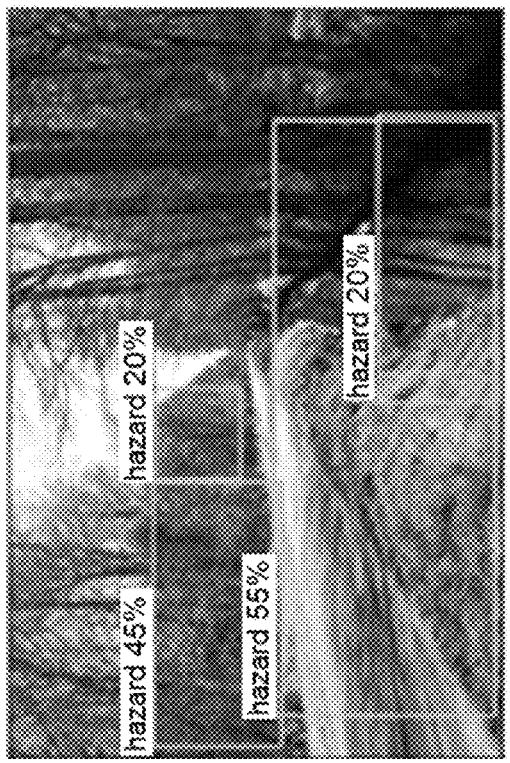

The system 100 compares successive frames of video to determine the amount of change in position in the scene. A drop-off is detected when there is a sudden change in this rate of motion. This technique also works for hills and obstacles, as shown in FIGS. 7 and 8.

Nominal motion is based on a rate of motion for a flat, horizontal surface at ground level. When the imager's boresight is horizontal, the apparent rate of motion is relative to the center of the image. This method works the best when camera geometry and carrier platform kinematics are known.

The current state of the art in AI includes using NN's and DNN's (Deep Neural Networks) to recognize particular classes of objects. The system 100 extends from distinguishable entities such as animals, people, vehicles, to vehicle hazards including roll-over, drop-offs, deep water, and mud. FIGS. 7 and 8 show examples of all these, and assigning "hazard percentages" accordingly.

Since these objects have no particular shape, the probability of high-confidence detection and the ability to distinguish between hazardous and non-hazardous instances is challenging. In order to create a feasible and effective solution, the embodiments herein combine multiple approaches. For example, a Parallax Method can be integrated with the DNN Based Object Detection.

FIGS. 7 and 8 show various elements having a sudden change in distance from streets, such as a grove of trees unusually close to the road. Another element is a water-filled ditch. These are all separately hazardous terrain, and achieve different levels of hazardousness, shown in FIGS. 7-8 as "hazard percentages", depending on many factors including how far from the road.

A driver may not see the drop-off at the side of the road. All she can see is some limited light-transition, and perhaps a disparity in color. The system 100 thus picks up that there that there's a drop-off or there's an embankment or something, and begins to learn the difference between the tops of trees (harmless, meaningless) versus bushes. And even though the drop off from a top of trees is as big as that down at the roadblock hazard, the system 100 knows to disregard the tops of trees as any hazard for a car, as cars do not drive on tops of trees, instead reacting much more strongly to the roadblock hazard. The system 100 thus provides assurances to a driver how close they can get to a creek yet still safely operate the vehicle, in a quickly readable way such as a "hazard percentage".

Drivers can note "that's a hazard" because of the drop off. Even though the drywall was wrong by the trees, they can just, things were being presented quizzes. So in those tops of distant trees is not a hazard, even though that is also an "edge". The system 100 can determine such an edge is unimportant, i.e. the bushes are not of concern, the tops of trees are not a concern, the moon and clouds are not a concern even though these have clear edges and clear drop-offs.

Why 3D Mechanisms can be Ineffective

Typical 3D viewing systems generate or capture image pairs of a scene from slightly different positions. These disparate images are presented to the left and right eyes of a viewer separately using some form of special display. The images are recombined by the brain into a single scene creating an impression of depth. While essential for creating virtual reality scenes for gaming or movies, they require expensive hardware and do not effectively address the problem of detection and avoidance of hazardous terrain.

The system 100 converts the visual information collected from multiple camera positions directly into geolocated keep-out regions that can be represented symbolically and applied to video through compositing. The source of images can be from a combination of cameras with overlapping fields of view and sequential frames from individual cameras on a moving platform. The computational load for compositing is much lower than that required to generate stereo images for human vision, since it does not require image reorientation or scaling.

To better explain this feature, FIG. 9 shows a large bump in a road. A driver might not see such an oblong shape\bump in the road, and then break an axle. It is desired to avoid that. So, within the system 100, a driver-assistance video-monitor sits on the windshield of the truck or Humvee, and that video-monitor 520/524/528 (see FIGS. 1A-1C) has the system 100 installed nearby, perhaps in a different part of the truck or Humvee that does not need to be near to the dashboard, but instead nearer to the one or more cameras positioned within the truck or Humvee.

The system 100 first makes that red trapezoid-shape around any bump it sees, and displays it for the driver. The system 100 uses that red trapezoid to flag the user (truck driver) by making a blue-filter (composite) so that nasty shape/bump shows up better, a quick alert for a driver whose eyes are mainly on the road, but are still aware of the video monitor. One way to make a nice clear warning to a driver is to make a "composite" type of image, where the pixels are bunched or staggered in order to preserve the main shape of the problem-area, but be so absurdly distorted that its clear this is intended to be a driver-alert "warning" type of image, not a mere natural image that happens to have an odd texture. This compositing can be done in a variety of ways, including changing color (e.g. bright Day-Glo orange on a typical drab side-of-road greenish-brown landscape), and may be achieved by the compositor 116 (FIG. 1C). First detected it, so make that casket-shape (composited shape) on the RH side of FIG. 9 over the top of the big bump, trying to show the look and shape.

Because patent images must be B&W only, its not possible to display such color-changes in a patent disclosure, so FIG. 9 shows a composite image serving as a warning to a driver, using a clearly visible format but constrained by the requirement for black and white. Again, as stated many times, describing and disclosing innovations related to image processing and video processing are made more difficult in a patent disclosure, which cannot demonstrate video or motion or color. The composite shown in FIG. 9 may not be exactly what is shown to a driver during actual live use of the embodiments herein, so instead lets say the composite in FIG. 9 is meant to convey an image-alteration that preserves the shape and location of the original item, but is altered in such a way to show a dangerous condition or problem that a driver should be aware of. FIG. 9 is just one of many ways of achieving this, such that the embodiments herein should not be considered as limited exclusively thereto.

Another example might be not in car, but on a tractor. In a farming field, a person driving a tractor could he hit a big rock and hurt the tractor or other equipment. The system 100 would have detected the rocks, save money for the farmer.

Depth Perception without 3D Glasses

The system 100 provides a type of depth perception for a driver, but without having to have 3D glasses. Other attempts to solve this problem involved building in 3D capability. However, 3D perception is not the best way to detect a hazard, as some hazards may not be visible at all, thus 3D capability would not make any difference. FIGS. 7-8 show a drop off not viewable and a driver may think they are just driving past some bushes. FIGS. 7-8 are re-referenced here merely to show examples where 3D capability is not going to help a driver.

As such, solutions which are 3D enabled are solving the wrong problem. Instead of 3D-enabling, the system 100 lights up warning posting "top of the hazard" when the system 100 detects hazards in some way. Meanwhile, the system 100 lights up and signals the driver "stay out of this region". If driver wants to know why, the system 100 puts a name on it e.g. "ditch" or "culvert" or "hidden culvert" but does not have to show the driver a three-dimensional image of the whole item. The system 100 just needs to make sure the driver has been made aware.

Figure 10:
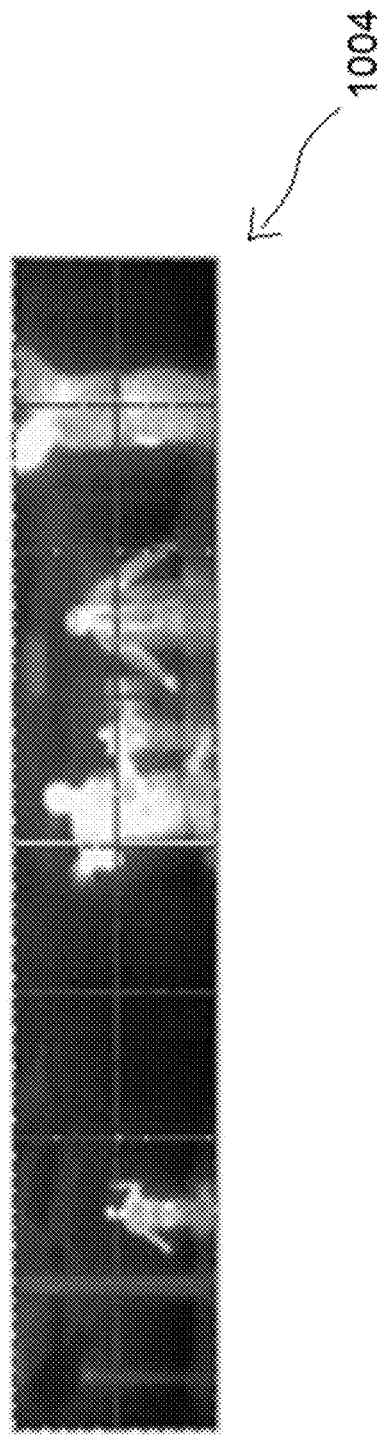
FIG. 10 shows a panoramic 360 degree view produced using conventional thermal cameras.

FIG. 10 shows a panoramic 360 degree view 1004 produced using conventional thermal cameras. However, thermal cameras are expensive. The specific items in FIG. 10 could be flowers and bunnies, anything, the principle being demonstrated is mainly a panoramic view using thermal cameras.

Thermal cameras can reach $20K, $30K, $40K apiece. Because you can set with your setup or you can use just one camera to get the 360 degrees. There are many factors affecting the cost of commercial off the shelf thermal imagers. In the simplified example of FIG. 10, now consider the cost of 360×60 deg coverage for thermal imagers.

640×480 pixel thermal imagers would cost ~$20K. It would require approximately 1200 32×32 imagers to cover the same for as much as $120K.

320×240 pixel thermal imagers cost ~$6K. The cost of lens system would also be slightly less expensive. In addition the SASS 360 may not need full coverage at the upper elevations further reducing system cost.

Figure 11:
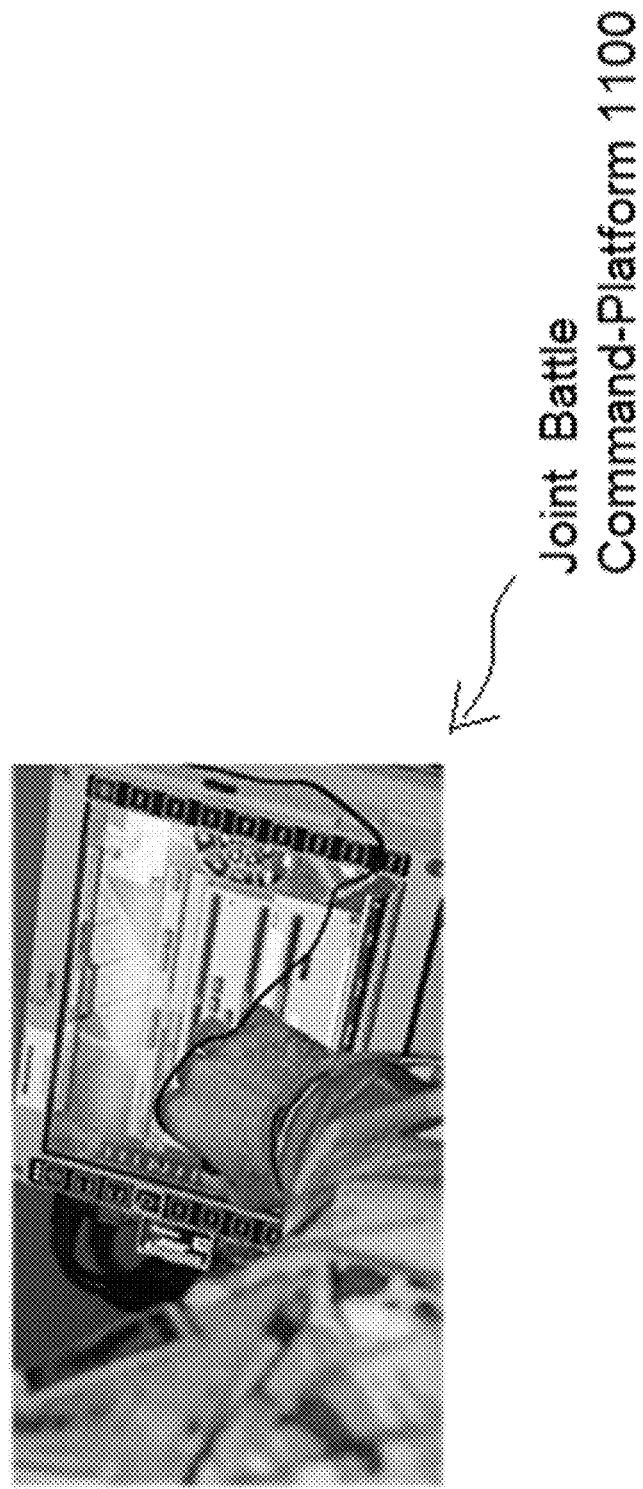
FIG. 11 shows an example Joint Battle Command-Platform (JBC-P)

FIG. 11 shows an example Joint Battle Command-Platform (JBC-P). The JBC-P and the system 100 get along and can be combined. The system 100 sits nicely on top of JBC-P.

Figure 12:
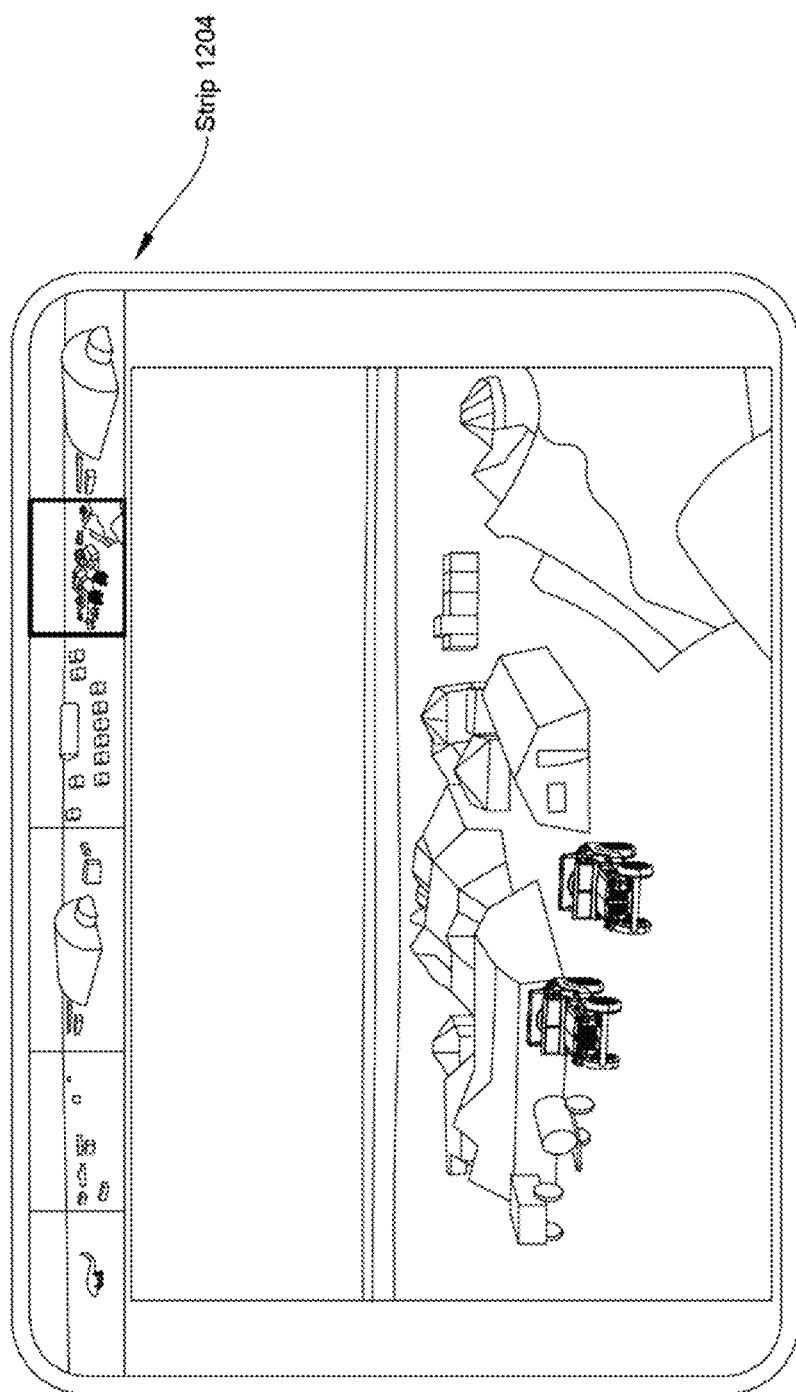
FIG. 12 shows how another example display might work within the system.

FIG. 12 shows how another example display 120\124\128 might work within the system 100. At the top, users have a 360 degree view strip 1204 of an entire view, and they select whatever image they want to look at. See the world around the viewer from e.g. inside a tank, and can also post up view direct. The top strip shows the 360 degree view, and enables a user to then select a portion of the 360 degree view for larger-scale viewing.

Figure 13A:
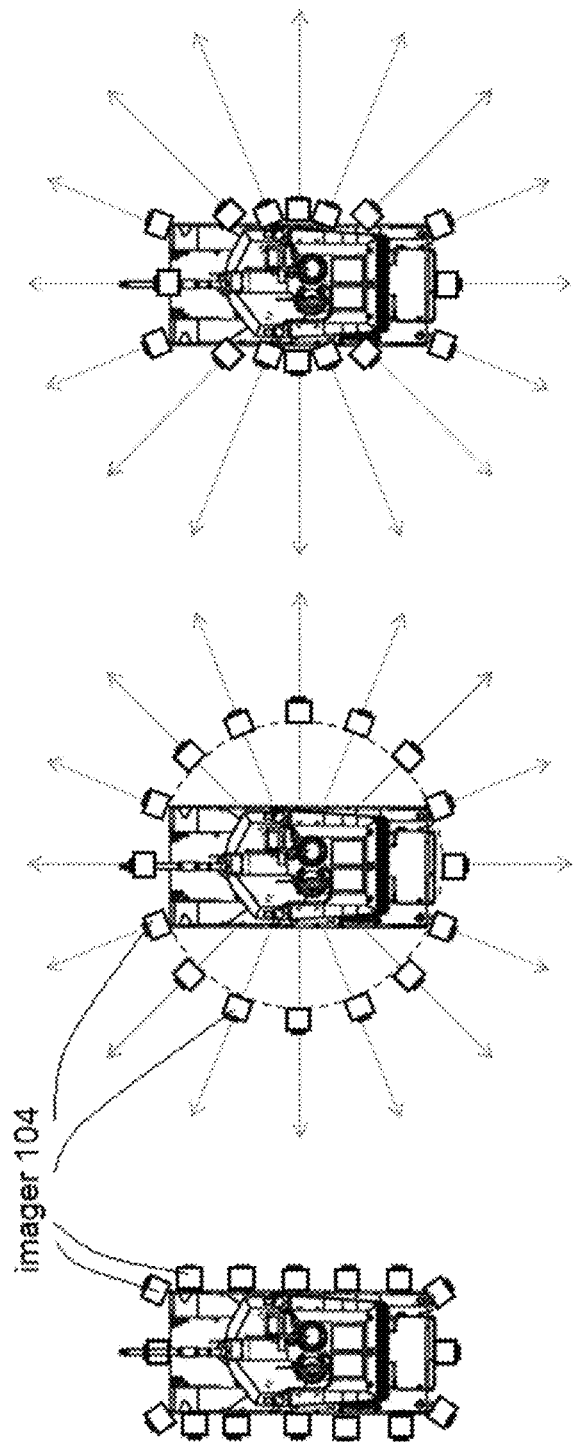
FIGS. 13A-13B show tanks fitted up with imagers in various positions and spacing.
Figure 13B:
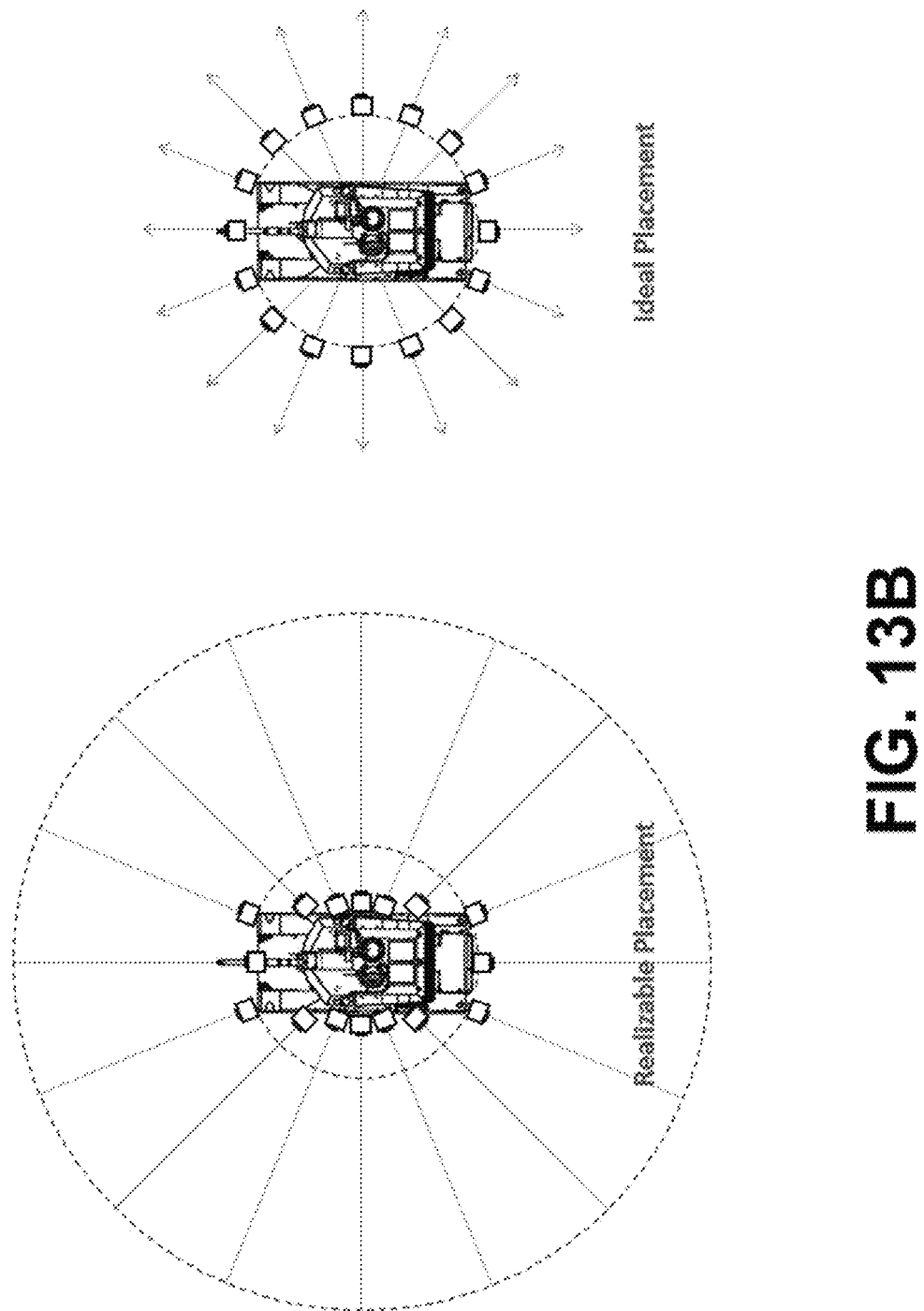

FIGS. 13A-13B show tanks fitted up with imagers 104 in various positions and spacing. Specifically, FIGS. 13A and 13B show some aspects of placements of the imagers (cameras) 104. Adjusting camera angles so that the optical axes of all cameras pass through the same point reduces the complexity of the image stitching approach. This means that the relative angles of the cameras will not be uniformly distributed around the vehicle. FIG. 13B compares realizable placement with ideal placement.

ADDITIONAL CONSIDERATIONS

It is well-known and obvious that the system 100 does not get to choose the environments in which it is installed. Further, battlefield conditions in e.g. desert conditions may occur in a "moonscape" type of environment, in which there are no trees, shrubbery, bushes, or other helpful roadside items by which the system 100 makes important image-processing decisions. The system 100 can still accommodate such bleak environments, although more processing and time may be required. An example of such a bleak gravel landscape lacking distinguishing features is shown in FIG. 14, the uppermost image.

Figure 14:
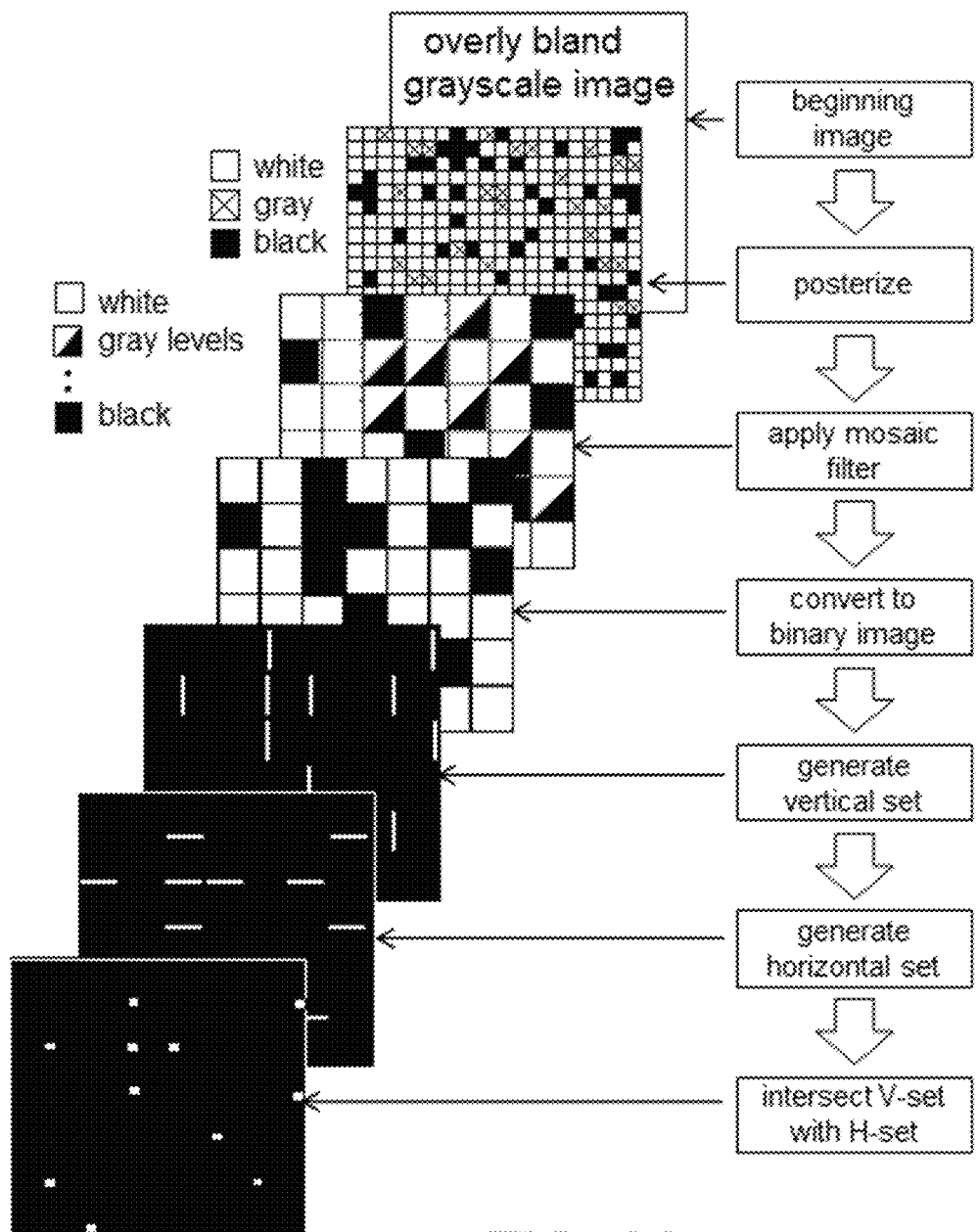
FIG. 14 shows how the system manages image stitching with bleak gravel moonscape types of backgrounds by running the images through a variety of filters and mechanisms.

FIG. 14 shows how the system manages image stitching with bleak gravel "moonscape" types of backgrounds. This is achieved by running the images through a variety of filters and mechanisms. The beginning image is exactly what a typical unaltered digital camera would see and capture. However, the system 100 performs much processing afterwards to find an appropriate small patch 504, and perform image stitching. For clarity, and due to smallness of size, no boundary blocks are shown in FIG. 14, but should be assumed.

FIG. 14 shows that a first step is to use a posterizing filter, which reduces the number of colors in the image. Then, a mosaic process occurs. After mosaic-ing the image, FIG. 14 then show converting the image into binary, which typically means that for each pixel, decide whether to make that pixel white or black. The system 100 uses a color version of the standard binary filter which sets each color component to 255 or to 0 depending on whether that component is currently larger or smaller than 128. To obtain the standard black/white binary image, first convert the image to a grayscale image FIG. 14 next shows generating a vertical set, which is helpful for finding the right-side edges of a second set of detected blocks. FIG. 14 next shows generating a horizontal set, which is helpful for finding the bottom edges of a first set of detected blocks. The horizontal and vertical sets are then combined in order to find lower RH corners of detected blocks. Then, the points (x,y positions) from each image are "collected" from the bitmaps and loaded into a container class-type list. Eventually, a small patch 508 is selected, even in environments of severe homogeneity of color and texture.

Gate Runner Embodiment

There are some other embodiments not yet mentioned that can result from skillful installation of the system 100. Consider a situation with the gate runner, where a guardhouse sees a blue Toyota Camry didn't stop at the gate so they can tag it and request of the system 100y "tell us exactly where this Camry travels to at any given second". As it gets picked up into different cameras, the system 100 knows that's a Civic, not the Camry. The system 100 would then automatically realize to quit following the Civic, and instead stay focused on the Camry.

Autonomous Driving: Artificial Intelligence and Machine Learning

The system 100 also provides a road-tested, pragmatic approach to verifiable Artificial Intelligence (AI) and Machine Learning (ML). It addresses the need for more precise monitoring of information exchange at the boundaries between the real-world and a digital domain, thereby achieving deployment of safe autonomous AI/ML applications. The system 100 differentiates between bounded Machine Learning (ML) models and Continuous/Adaptive ML Models. These embodiments are centered on systems that automatically modify their own algorithms or change their outputs based on self-identified improvements.

Traffic Accidents

When AI is confined to game bots and software simulations, catastrophic errors are inconsequential. However, when AI is controlling real-world systems such as autonomous driving. It is in everyone's best interest that private companies and researchers who are testing and deploying safety-critical AI/ML systems work diligently to justify the trust being placed in them by the public. In the following series of example embodiments, the value of integrating software agents that monitor the actions and decisions into an AI/ML system are demonstrated at the outset. One approach to applying agents to monitor the information crossing the boundary between the real-world and the digital domain as depicted in FIG. 15.

Figure 15:
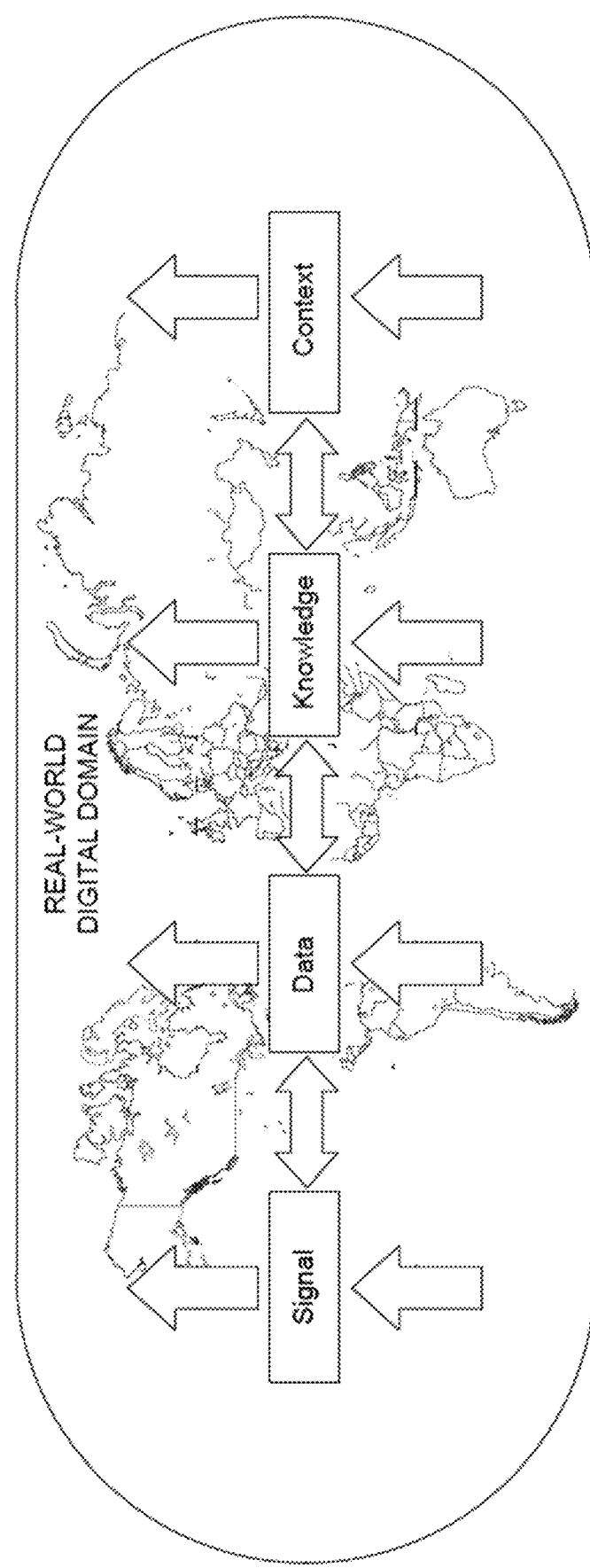
FIG. 15 shows how the system operates at four distinctly different levels, comprising signal level processing.

FIG. 15 shows how the system 100 operates at four distinctly different levels, comprising signal level processing. Input at this level is accomplished by electronic sensors that convert physical phenomena into digital values. It is important to understand what information crosses this boundary and what information is lost. For example, time does not cross this boundary. If time is important, it must be included as a tag or index.

Digital images are typically tagged with date, time, and location. It is less common to include the orientation of the camera or its optical properties. This information can be used to enhance situational awareness for an AI system by providing the context that is typically lost at the boundary between the human and digital domains.

The data level represents records of a symbolic or syntactic nature. Input at this level could be direct keyboard entry or any form of grid data e.g. spreadsheets. Pattern recognition, classification and clustering typically involve processing of traffic-grid data.

FIG. 15 also shows the semantic relationships between entities are represented at the knowledge level (e.g., in conceptual graphs). Finally, a context level represents an AI system that "understands" human queries.

Figure 16:
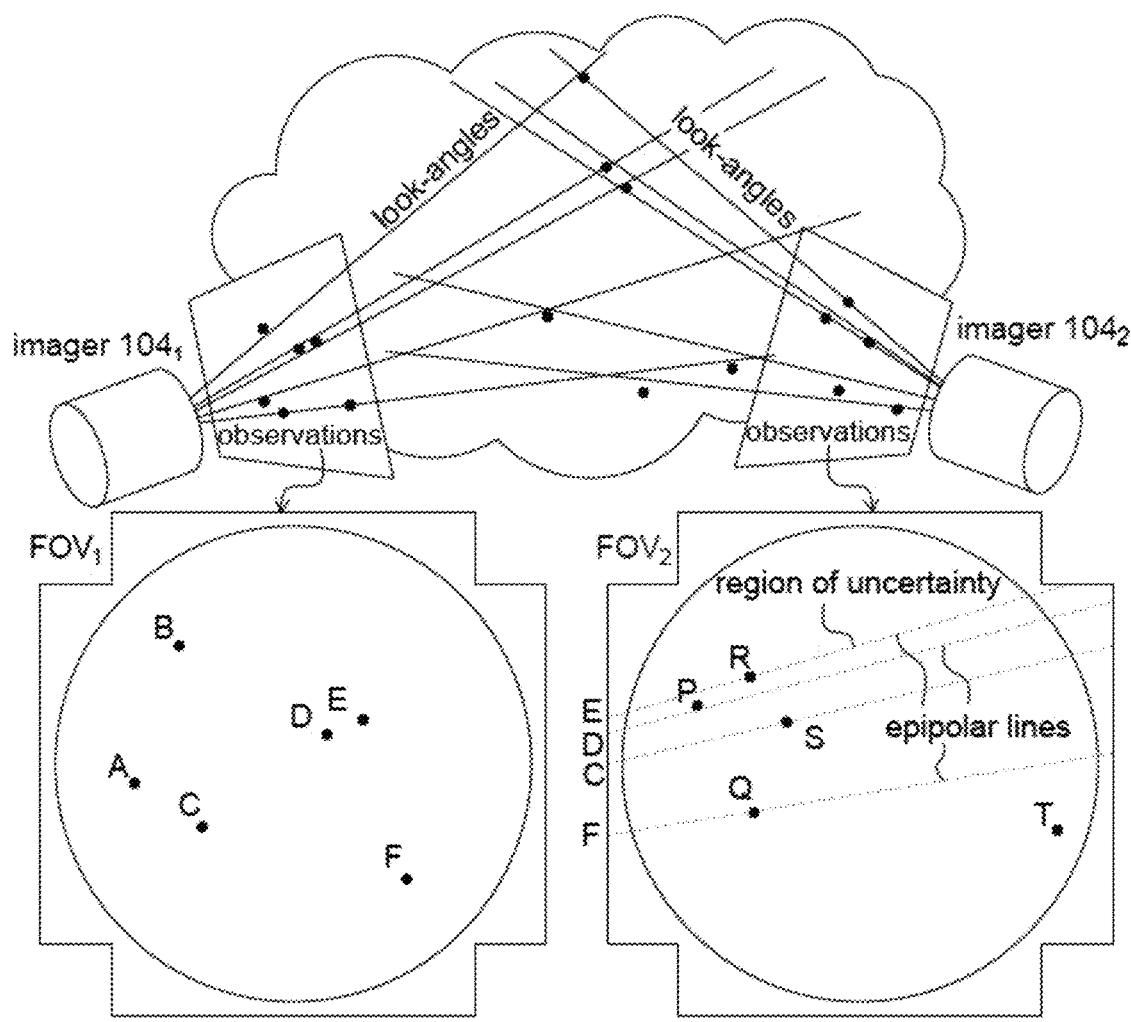
FIG. 16 shows sensor fusion of objects in the form of patterns of dots.

Next, FIG. 16 shows sensor fusion. In sensor fusion, the task is to match observations of point-sized objects in a cloud viewed by multiple imaging sensors separated from each other in three-dimensional space. The purpose of sensor fusion was to be able to determine the three-dimensional coordinates of the objects in the cloud. The objects appeared in the images as patterns of dots, as shown in FIG. 16.

The sensors in FIG. 16 are optical sensors. As these, these optical sensors had no direct measurement of the distances to the objects from the sensors. At first, it was expected this to be a "simple" geometry problem with pattern matching. However, due to the large number and density of the objects, the problem turned out to be a bit more involved. Using the known locations of the imaging sensors and their optical configurations, the system 100 establishes a straight line from a sensor through an observation projected into the object cloud was established. Such a projection is called an epipolar line.

Every observation in a sensor's field-of-view, say $FOV_1$ casts a projected line along the look-angle. Each point in $FOV_1$ has a corresponding epipolar line as viewed in another sensor's field-of-view, say $FOV_2$. The correctly matched object must lie on this line or within the measurement uncertainty of the sensor. There are usually multiple objects within the epipolar line's region of uncertainty. Fortunately, the sensors and objects of FIG. 16 were moving. As they moved, the points that fell inside the regions of uncertainty would change.

While there were multiple matching candidates at any given time, only one object was consistently on or near the epipolar line of the matching object. Accordingly, unique matches can be obtained by repeatedly performing set intersection operations on these object sets for each epipolar line. Without the details of the sensor locations, motion, pointing direction, and optical configuration, any AI approach would have been computationally costly while producing a high error rate. By including the aforementioned sensor details, the AI problem was reduced to one of logical set operations and geometric triangulation.

Hazardous terrain detection combines multiple, open-source, object recognition agents, with a terrain detection agent based on geometry and an agent to track sensor orientation and optical configuration originally employed to support sensor fusion. The hazardous terrain problem is an excellent example of the value of being able to query AI/ML applications with respect to why a particular decision was selected from a variety of choices.

Imager-only depth-perception can be implemented spatially using two or more cameras as well as temporally using consecutive video frames. A situation awareness agent can catch and eliminate erroneous object detection results that are in conflict with image context. The system 100 thus provides a method of communicating hazards to the user through symbolic compositing onto the driver display.

Returning to FIG. 15, the importance of monitoring the transmission of information over the boundary between the real-world and digital domains is contemplated. Using sensor fusion, the system 100 relies on a knowledge of the quality of measurements and the configuration of the sensors that is being transferred at the signal level. In order to implement this algorithm, the size of a region of uncertainty around epipolar lines is typically a function of the resolutions of the sensors. The mathematical projection of the epipolar line requires a knowledge of sensor locations in space, an optical field-of-view, and the look-angle of the sensor. Finally, the system must have the ability to apply logical set operations using rules passed at the knowledge level.

Edge processing of the video to support image stitching and registration is occurring at the signal level. Simultaneously, a panoramic view is output to the user at the same signal level. Camera configuration and kinematics communication is occurring at the data level. Situational awareness in the form of compositing onto the driver display is occurring at the knowledge level. Finally, first-principles and permanency agents are maintaining an understanding of potential hazards at the context level. The system 100 thus provides a hazardous terrain detection system for the feasibility of boundary monitoring to support explainable and verifiable land conditions.

DISCLAIMER

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A method of configuring a system for performing image stitching, comprising:
    positioning one or more imagers for working in coordination with one or more custom modules, each imager corresponding with one custom module;
    in a situation with two or more imagers, arranging the one or more custom modules for capturing and processing approximately one third the Field of View (FoV) of each imager in either a still frame context or a series of video images (sequenced frames), thereby avoiding gaps in a resulting captured view;
    searching a first frame for a partial patch within that frame for detail and edges and color changes and transitions in just that partial patch, according to predetermined criteria;
    finding the best partial patches that contain detail that is unlikely to make an accidental match with a following or adjoining frame;
    choosing the small patches where selection criteria is which small patches (chunks) are likely to appear in a following image (if single-camera video), or likely to appear in an adjoining frame (if multi-camera video);
    within the chosen (first) frame, once selected, setting up a plurality of boundary blocks for marking out a selected partial patch;
    bringing a second frame that is similar to the first frame into the system;
    searching the second frame for any small patch that has the characteristics of the selected partial patch within the first frame;
    finding the matching region within the second frame;
    once the matching region within the second frame is found, performing image stitching on both images; and
    displaying the altered images on a computer display.

2. The method of claim 1, comprising:
the imagers achieving two/thirds overlap between FoVs thereby minimizing degrading of the resulting images yet still achieving full 360 degree coverage.

3. The method of claim 1, comprising:
the stitching occurring across the one or more imagers simultaneously.

4. The method of claim 1, comprising:
the stitching occurring across time, within two consecutive frames within the same imager.

5. The method of claim 1, comprising:
the stitching occurring across the one or more imagers simultaneously; and
the stitching occurring across time, within two consecutive frames within the same imager.

6. The method of claim 1, comprising:
configuring the partial patch to be equivalent to an area $\frac{1}{100}$ the size of the overall frame.

* * * * *